UNITED STATES PATENT OFFICE.

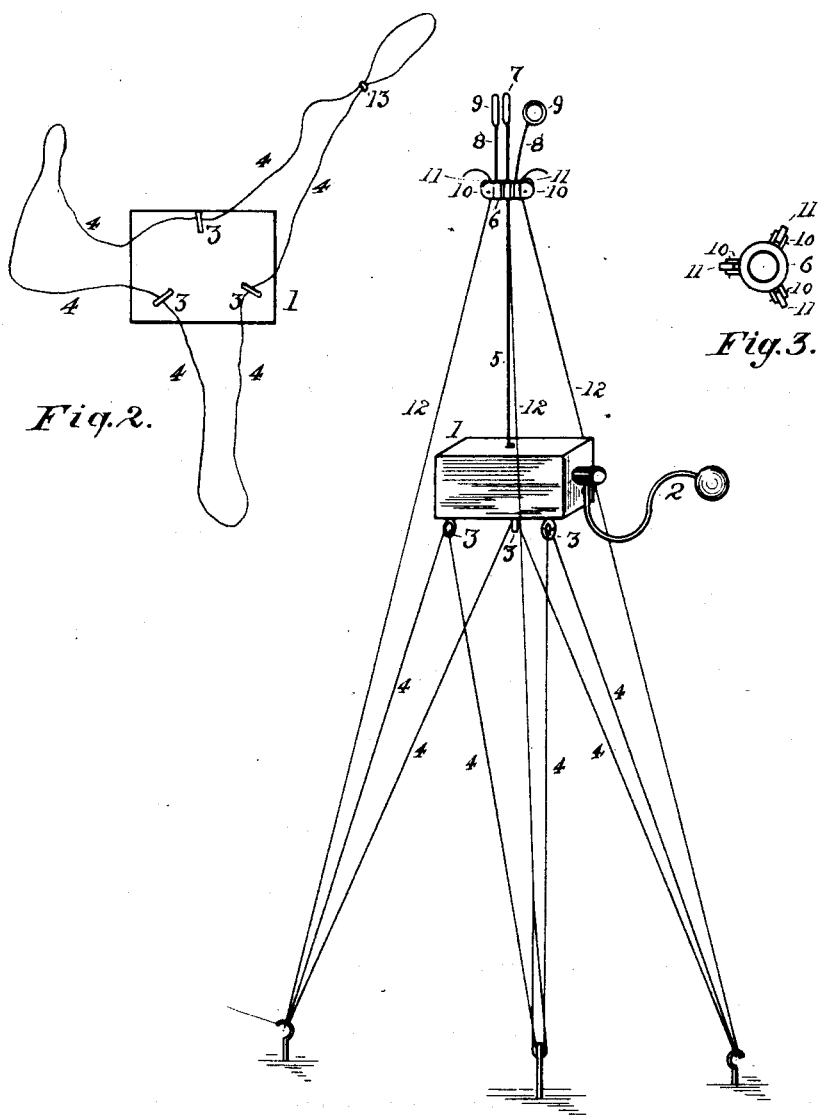

ADDISON T. SAUNDERS, OF AKRON, OHIO.

SUPPORT FOR PHOTOGRAPHIC CAMERAS.

SPECIFICATION forming part of Letters Patent No. 681,345, dated August 27, 1901.

Application filed June 14, 1900. Serial No. 20,316. (No model.)

*To all whom it may concern:*

Be it known that I, ADDISON T. SAUNDERS, a citizen of the United States, residing at Akron, in the county of Summit and State of Ohio, have invented a certain new and useful Improvement in Supports for Photographic Cameras, of which the following is a specification.

My invention has a general relation to improvements in portable camera-supports, and has especial relation to that class designed for small cameras.

The objects of my invention are to provide a new and improved support that will be sufficiently firm to give necessary stability to the camera during the time of exposure and capable of being compressed to occupy a minimum of space in transportation, the weight of which will be insignificant.

The essential feature of my invention consists of a number of inelastic cords or parts of a continuous cord attached to various points on the camera, extended to the ground or to suitable adjacent objects at a number of points, preferably three, corresponding to the location of the feet of a tripod and held or anchored there, in combination with means for lifting the camera upward to draw these cords taut.

A further feature consists in a number of auxiliary cords also anchored and carried to the point of the camera-lifting means to afford steadiness where the hand of the operator is the means employed.

To the foregoing objects my invention consists in the peculiar and novel construction, arrangement, and combination of parts hereinafter described and then specifically pointed out in the claims, reference being had to the accompanying drawings, forming a part of this specification.

In the accompanying drawings, in which similar reference-numerals indicate like parts in the different views, Figure 1 is a general view of my improved support with the cords in tension; Fig. 2, a bottom plan of the camera with cords relaxed; Fig. 3, a detail of the cord-clamping hoop to hold the auxiliary cords and hereinafter described.

Referring to the figures, 1 is a camera with bulb and tube 2 for opening and closing the shutters. In the bottom of the camera are three rings or screw-eyes 3, through which is passed a cord 4, the ends being joined, thus making it practically endless. To the top of the camera is attached an elastic cord 5, that passes through a hoop 6 and terminates in a ring 7. To this hoop 6 are attached two elastic cords 8, terminating in rings 9. The hoop 6 has pairs of wings 10, between each pair of which is pivoted a cam 11, arranged to have its greatest diameter so approach the hoop 6 as to compress and bind a cord between them. Auxiliary cords 12, provided with lower looped ends, pass severally between a pair of the wings 10 and are retained by the cams 11, thus adjustably securing them.

In operation the three depending loops of the cord 4 are severally fastened to some anchorage. Hooks are shown in the drawings simply to indicate a means; but it may be trees, roots, stumps, or stones, or two may preferably be connected with the operator's feet. To facilitate fastening to stones or like objects, a ring 13, as shown in Fig. 2, is passed over these loops to convert them into a species of slipping noose and enable them to be drawn snugly. It will be seen that when in use the various loops of the cord 4 form practically separate cords, each performing its separate function as if fixedly and separately attached to the camera (or to the ring through which it passes) and to the fixed object or anchorage. Therefore while the preferred manner of carrying out my invention is by using a continuous cord divided in its adjustment into separately-acting and opposing cords, if preferred it may be separated into or replaced by such separate cords without affecting the principle involved or the results obtained, except in the matter of convenience. From this it is evident that while preferably of one piece it is proper to treat it technically as made up of separate cords, and I therefore so treat it in the claims. The rings 7 and 9 are passed onto a finger or fingers of the operator's hand, who by raising the hand draws the elastic cord 5, thus straining the parts of the cord 4, and by the same operation draws the cords 12 snugly. Thus the camera is supported and braced in position sufficiently rigid to permit of an exposure of the sensitized plate, which is effected in the usual manner by compressing the bulb 2 with the other hand. The cords 12 may be dispensed with by a person of steady hand; but I prefer their use as a means for securing greater steadiness in all cases.

I have used the term "cords" as a means of anchorage and support; but I do not wish to limit myself in this regard, as light wires or chains may be employed; but cords will ordinarily be found sufficient on account of extreme lightness and facility of being folded compactly.

I claim as my invention—

1. An improved camera-support consisting of cords adapted to be connected with a camera, and arranged to be secured to separate fixed objects, in combination with a means to be operated by hand to draw said camera upward to render said secured cords taut, substantially as shown and described.

2. An improved camera-support consisting of cords connected with the camera and arranged to be secured to fixed objects in combination with an elastic cord to draw said camera upward to render said cords taut, substantially as shown and described.

3. An improved camera-support consisting of cords connected with the camera and arranged to be secured to fixed objects, a cord to draw said camera upward, and auxiliary cords arranged to be connected with said several fixed objects, and held in connection with said camera-drawing cord and to be simultaneously drawn taut therewith, substantially as shown and described.

4. An improved camera-support consisting of cords connected with the camera and arranged to be secured to fixed objects and an elastic cord to draw said camera upward, in combination with auxiliary cords arranged to be connected with said fixed objects, united above said camera and provided with elastic cords adapted to be held in connection with the camera-drawing cord, and to be simultaneously drawn upward therewith, substantially as shown and described.

5. An improved camera-support consisting of cords adapted to be connected with a camera, and arranged to be secured to fixed objects in combination with elastic means to be operated by hand to draw said camera upward to render said cords taut, substantially as shown and described.

In testimony that I claim the above I hereunto set my hand in the presence of two subscribing witnesses.

ADDISON T. SAUNDERS.

In presence of—
C. P. HUMPHREY,
C. E. HUMPHREY.